United States Patent [19]
Baker et al.

[11] Patent Number: 5,346,268
[45] Date of Patent: Sep. 13, 1994

[54] TOOL FOR LIFTING GRILL OFF OF BARBECUE BURNER

[76] Inventors: Lester H. Baker, 340 S. Lynx Creek Rd., Prescott, Ariz. 86303; Donald B. Mitchell, 515 W. Highland, Phoenix, Ariz. 85013

[21] Appl. No.: 151,150
[22] Filed: Nov. 12, 1993
[51] Int. Cl.⁵ ............................................ A47J 49/00
[52] U.S. Cl. .................................... 294/9; 294/19.1; 294/34; 294/103.1
[58] Field of Search .................................. 294/9–16, 294/19.1, 22, 26, 34, 103.1, 104

[56] References Cited

U.S. PATENT DOCUMENTS

| | | | |
|---|---|---|---|
| 1,138,131 | 5/1915 | MacRae | 294/34 |
| 1,166,301 | 12/1915 | Yoho | 294/12 |
| 1,722,953 | 7/1929 | Cole | 294/10 |
| 2,066,185 | 12/1936 | Miller et al. | 294/19.1 X |
| 2,326,676 | 8/1943 | Peters | 294/11 |
| 3,032,367 | 5/1962 | Thurston | 294/103.1 |
| 3,918,757 | 11/1975 | Huber | 294/103.1 X |
| 4,240,657 | 12/1980 | Feighery | 294/11 |
| 4,601,505 | 7/1986 | Chilton | 294/26 |
| 5,071,182 | 12/1991 | Mair | 294/12 |

*Primary Examiner*—Johnny D. Cherry
*Attorney, Agent, or Firm*—Warren F. B. Lindsley

[57] ABSTRACT

This invention is directed to a tool comprising a pair of hand grasping juxtapositioned rods which are clamped together for movement under spring bias one relative to the other. A pair of heads are mounted one on each of the common ends of the rods for grasping therebetween the grid of a barbecue grill.

5 Claims, 2 Drawing Sheets

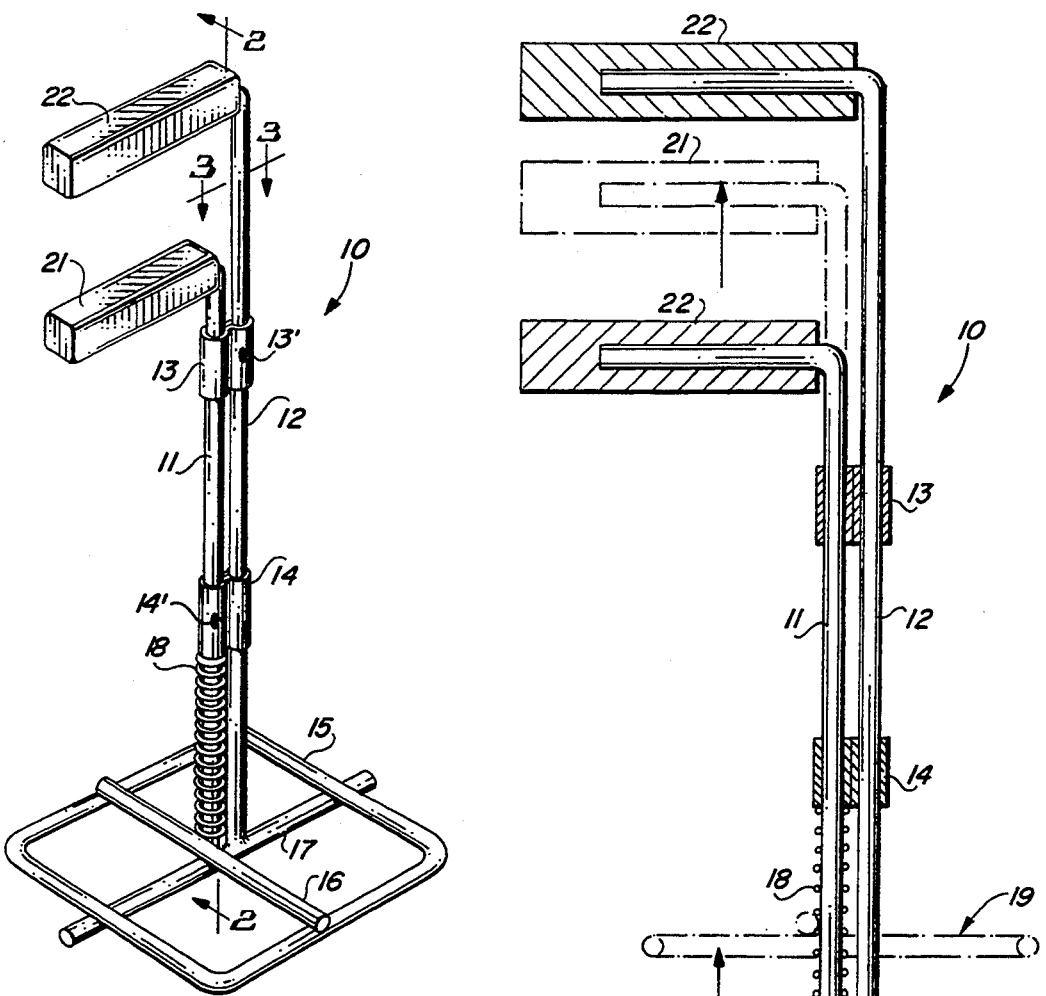
FIG-1
FIG-2
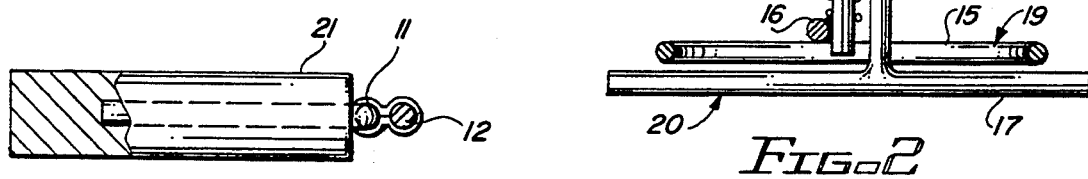
FIG-3
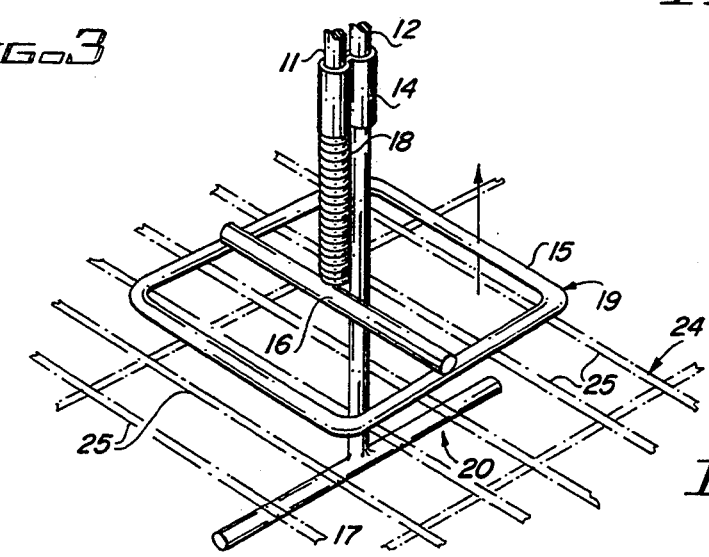
FIG-4

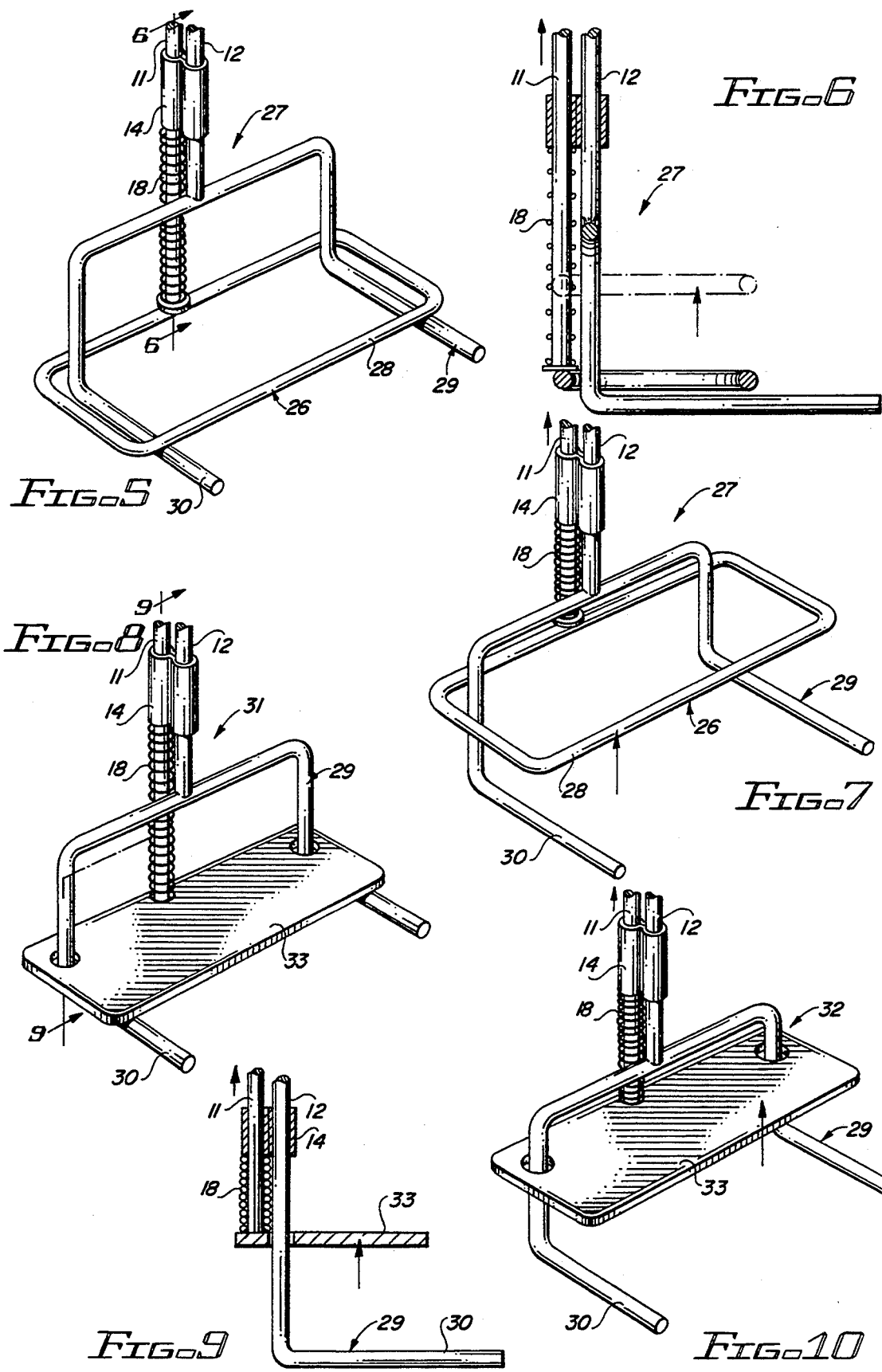

5,346,268

TOOL FOR LIFTING GRILL OFF OF BARBECUE BURNER

BACKGROUND OF THE INVENTION

This invention relates to barbecuing and more particularly to a tool for lifting grates, plates and grids off of the burner of barbecuing equipment.

The quick and easy tool disclosed for lifting grid plates and ash grates from a burner assembly, especially when hot releases one hand for adding to, moving about and/or removing hot or cold charcoal briquets from the barbecue assembly. This tool is also useful after barbecuing for removing the messy grills from the burner for cleaning purposes.

DESCRIPTION OF THE PRIOR ART

Heretofore, forks, pliers, gloves or the like have been used to remove the grids from the burner assembly usually with difficulty and messy results. With the prior art tools, it is difficult to remove the grid from the barbecuing burner while maintaining a secure attachment of the tool to the grid.

SUMMARY OF THE INVENTION

This invention is directed to a tool for use in barbecuing and more particularly to a tool used by one hand which grabs the rods of a grid for removing it from the burner assembly under cooking conditions in order to add to or adjust the hot briquets, It is, therefore, one object of this invention to provide a new and improved tool for use in barbecuing.

Another object of this invention is to provide a new and improved tool for firmly grasping the bars or rods of a grid plate used on barbecuing equipment with one hand for adjustment and/or removal purposes.

A further object of this invention is to provide a new and improved tool for use in adjusting or removing a grid from a barbecue burner comprising a pair of relatively movable cooperating gripping members operable by one hand of a user.

A still further object of this invention is to provide a pair of relatively movable rod mounted grid engaging heads one positionable above and one below the rods of a grid plate for firmly grasping the grid for adjustment or removal purposes operable by one hand of the user.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of a one hand operable tool for grasping the rods of a grid plate of barbecuing equipment and embodying the invention:

FIG. 2 is a cross sectional view of FIG. 1 taken along the line 2—2;

FIG. 3 is a cross sectional view of FIG. 1 taken along the line 3—3;

FIG. 4 is a partial view of the tool shown in FIG. 1 in a head expanded position ready for grasping the rods of a grid plate of a burner of barbecuing equipment;

FIG. 5 is a partial view of a tool similar to that shown in FIG. 1 showing a modification of the grid engaging head;

FIG. 6 is a cross sectional view of FIG. 5 taken along the line 6—6;

FIG. 7 is a view of FIG. 5 showing the grasping end of the toot in jaw spaced relationship;

FIG. 8 is a partial view of a modification of the grasping end of the tools shown in FIGS. 1 and 5;

FIG. 9 is a cross sectional view of FIG. 8 taken along the line 9—9; and

FIG. 10 is a view of FIG. 8 taken in the jaw open position of the tool.

DESCRIPTION OF THE PREFERRED EMBODIMENT

Referring more particularly to the drawings by characters of reference, FIGS. 1–4 disclose a tool 10 comprising a pair of hand grasping rods 11 and 12 which are clamped together side by side by spaced clamps 13 and 14 for movement one relative to the other In a longitudinal manner with clamps 13 and 14 secured rods 11 and 12 by welding of the like at points 13' and 14'.

The tool grasping end of rods 11 and 12 are each provided with a head formed of cylindrical bars which are mounted to extend laterally of rods 11 and 12. The head mounted on the jaw end of rod 11 may comprise, for example, a rectangular configuration 15 having a reinforcing rod 16 secured to and mounted to extend across the top of its rectangular configuration in about the center thereof as shown in FIGS. 1, 2 and 4. Other suitable geometrical configurations may be used and fall within the scope of this invention.

Rod 12 is provided with a single rod 17 arranged to extend laterally thereof at its jaw engaging end.

As noted from the figures of the drawings, rod 11 is provided at its jaw engaging end with an expansion spring 18 mounted to extend between clamp 14 and rod 16 so that in the normal inactive position of the tool, rod 11 is biased relative to rod 12 by the expansion of spring 18 causing the rectangular configuration 15 of head 19 to move toward and into engagement with head 20 formed by rod 17.

The hand grasping end of each of rods 11 and 12 are bent to extend laterally of their longitudinal axis and are provided respectively with insulating handles 21 and 22 which may be wood for decorative purposes.

In use, the operator grasps with one hand handles 21 and 22 and draws handle 21 toward handle 22 as shown in FIG. 2. This action causes head 19 at the end of rod 11 to move away from head 20 at the end of rod 12. With the heads of the tool separated they can be positioned with rod 17 below the rods of grill 24 and laterally of their longitudinal axis and the rectangular configuration of head 19 on the end of rod 12 above rods 25 of grill 24, by manually turning the entire tool 90 degrees left or right.

Upon release of the hand applied pressure on handle 21, head 19 will move toward head 20 capturing grill 24 between them in a firm and tight arrangement. Grill 24 may then be lifted up and away from the barbecue equipment with one hand of the operator.

An alternate method of grasping grill 24 can be employed if the grill has a single center supporting rod or bar at 90 degrees to rods 25. Rod 17 can be positioned beneath the center supporting bar or rod without manually turning the tool to left or right. Releasing handle 21 will then allow firm clamping action.

FIGS. 5-7 disclose a modification of the tool shown in FIGS. 1-4 wherein like parts are given the same reference characters.

As illustrated, tool 27 comprises a rectangular head 26 formed at the end of rod 11 which is biased by spring 18. Rod 11 is movable relative to a head 29 fixedly mounted at the tool grasping end of rod 12. Head 29 comprises a right angle U-shaped configuration 30.

Heads 26 and 29 operate relative to each other in the same manner as described above for FIGS. 1-4.

FIGS. 8-10 disclose a further modification of the tool shown in FIGS. 1 through 7 wherein tool 31 differs from the tool grasping head shown in FIGS. 5-7 by comprising a rectangularly shaped plate 33 forming head 32 mounted at the tool grasping end of rod 11.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A tool for barbecue use comprising:
   a pair of juxtapositioned longitudinal extending rods attached together with one rod being movably mounted relative to the other,
   a pair of cooperating heads mounted at one common end of each of said rods, said pair of cooperating heads having a separated position and a capture position, the separated position allowing one of said heads to be inserted through the grid of a barbecue grill, the capture position grasping therebetween the grid of said barbecue grill,
   spring means mounted on said tool for biasing one of said rods relative to the other of said rods for causing said heads to grasp the grid therebetween in the capture position, and
   a pair of handles mounted at the opposite common end of each of said rods for use in moving said rods to the separated position against said biased spring means for engaging and releasing the grid.

2. The tool set forth in claim 1 wherein:
   one of said heads comprises a rectangular configuration centered upon the rod upon which said one of said heads is mounted, the rectangular configuration having a reinforcing rod mounted to extend across said rectangular configuration, said reinforcing rod being secured to the mounting rod.

3. The tool set forth in claim 1 further comprising at least one point of attachment between said rods, and further wherein said spring means comprises a coil spring operable between the head of one of said rods and at least one point of attachment with the other of said rods.

4. A tool for barbecue use comprising:
   a pair of juxtapositioned longitudinal extending rods attached together with a clamp with one rod being movably mounted relative to the other,
   a pair of cooperating heads mounted at one common end of each of said rods for grasping therebetween the grid of a barbecue grill,
   spring means mounted around one of said rods and extending between said clamp and said one end of said one of said rods for causing said heads to be movable for grasping the grid between said heads, and
   a pair of handles mounted at the opposite common end of each of said rods for use in moving said rods against said biased spring means for engaging and releasing the grid.

5. The tool set forth in claim 4 in further combination with:
   a pair of covers one for each of said handles.

* * * * *